United States Patent [19]

Nelson

[11] Patent Number: 4,821,862
[45] Date of Patent: Apr. 18, 1989

[54] COIN-OPERATED TIMER FOR PAY TV

[75] Inventor: William W. Nelson, Long Beach, Calif.

[73] Assignee: Coinview Corporation, Ventura, Calif.

[21] Appl. No.: 53,265

[22] Filed: May 21, 1987

[51] Int. Cl.$^4$ .......................... G07F 17/00; H04N 7/16
[52] U.S. Cl. ...................................... 194/241; 194/350
[58] Field of Search ............... 194/219, 230, 231, 239, 194/240, 241, 350, 353; 455/1, 231; 358/349; 380/16

[56] References Cited

U.S. PATENT DOCUMENTS

| | | | |
|---|---|---|---|
| 2,918,522 | 12/1959 | Ridenour | 380/16 |
| 3,192,313 | 6/1965 | Rubinstein et al. | 194/239 X |
| 3,249,689 | 5/1966 | Davis et al. | 380/16 |
| 3,347,982 | 10/1967 | Bass et al. | 380/16 |
| 4,317,213 | 2/1982 | DiLorenzo | 455/1 X |
| 4,541,519 | 9/1985 | Belviso et al. | 194/241 |
| 4,566,033 | 1/1986 | Reidenouer | 194/241 X |
| 4,676,358 | 6/1987 | Rosendahl, Jr. | 194/241 X |

FOREIGN PATENT DOCUMENTS

| | | | |
|---|---|---|---|
| 2830541 | 1/1980 | Fed. Rep. of Germany | 358/349 |
| 0030318 | 3/1977 | Japan | 358/349 |

*Primary Examiner*—Joseph J. Rolla
*Assistant Examiner*—Edward S. Ammeen
*Attorney, Agent, or Firm*—Gene W. Arant

[57] ABSTRACT

A coin-box placed adjacent to a television receiver is interposed in the path of a signal input line that supplies program signals to the receiver. Signals on some program channels (the "free" channels) are permitted to pass through the coin box at all times. The purpose of the coin box is to require payment for the reception of programs on certain other selected frequency channels (the "pay" channels). One or more band rejection filters (frequency traps) are utilized within the coin box to normally prevent reception of the pay channels. A bypass circuit, controlled by a relay, permits the pay channels to be received during time periods that have been paid for. The coin-box is lockable for security purposes and contains a timing circuit, a relay, and other controls. The selection of pay channels as well as the various control parameters may be adjusted at will by the proprietor of the establishment in which the television set is located.

19 Claims, 3 Drawing Sheets

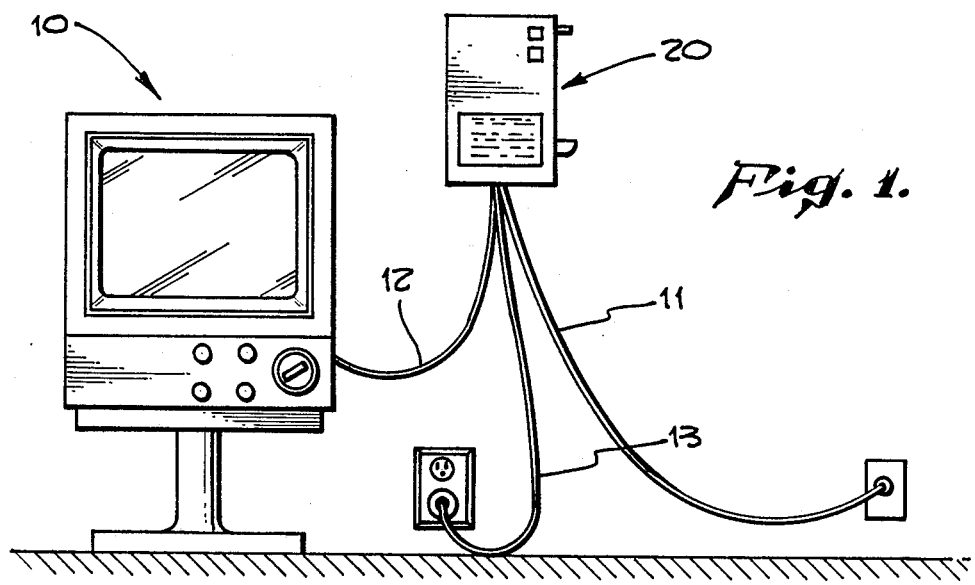
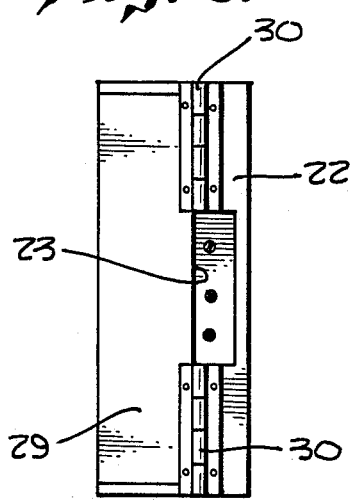
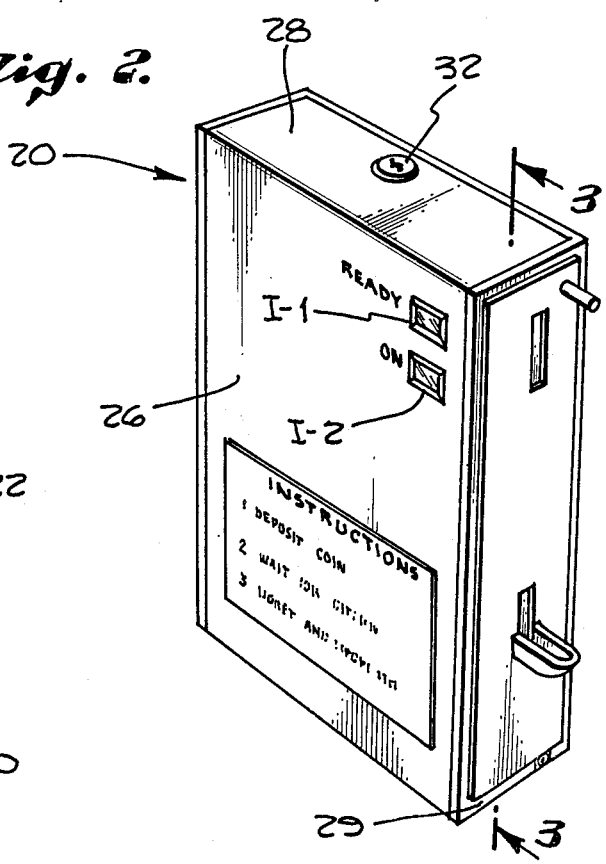

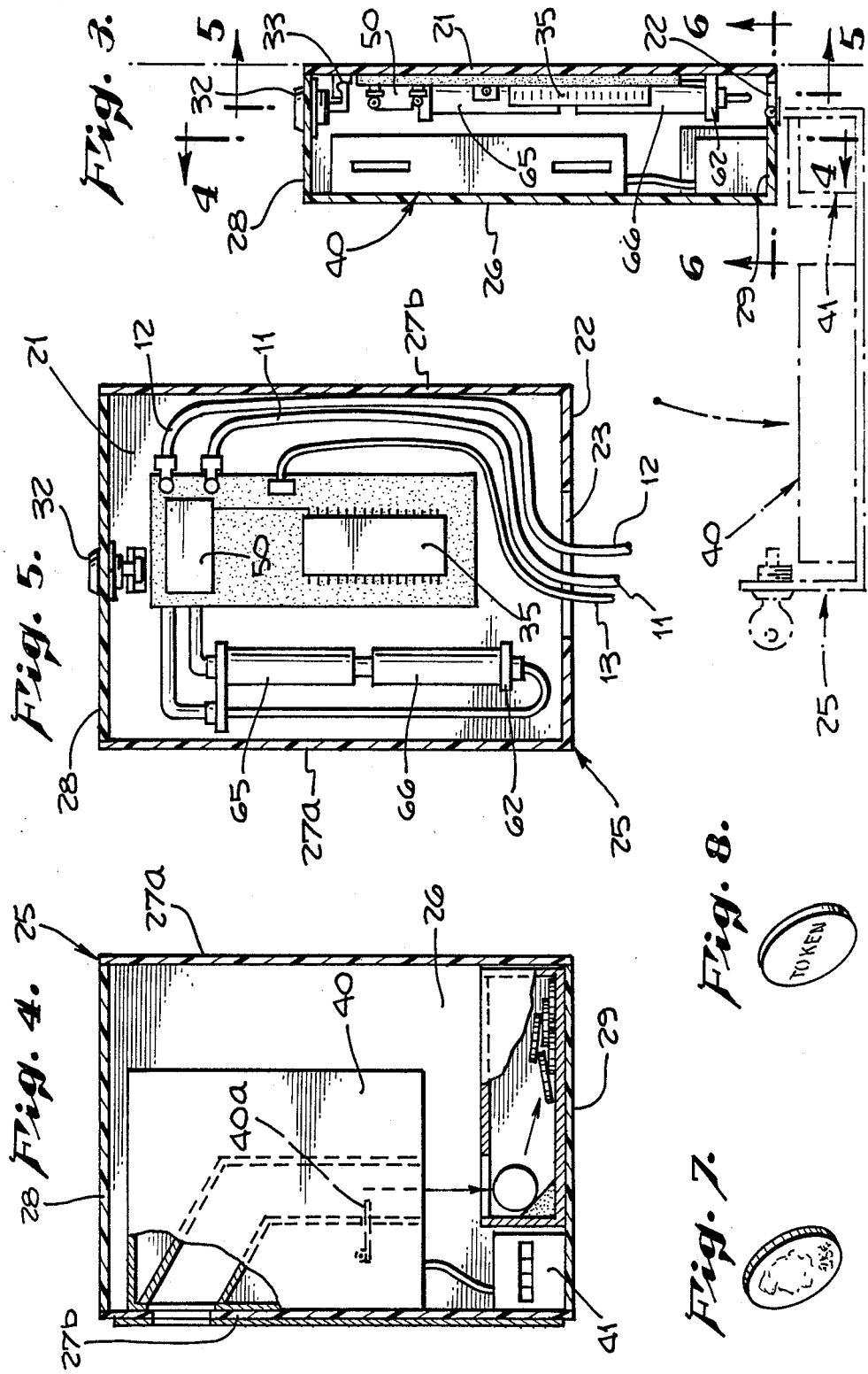

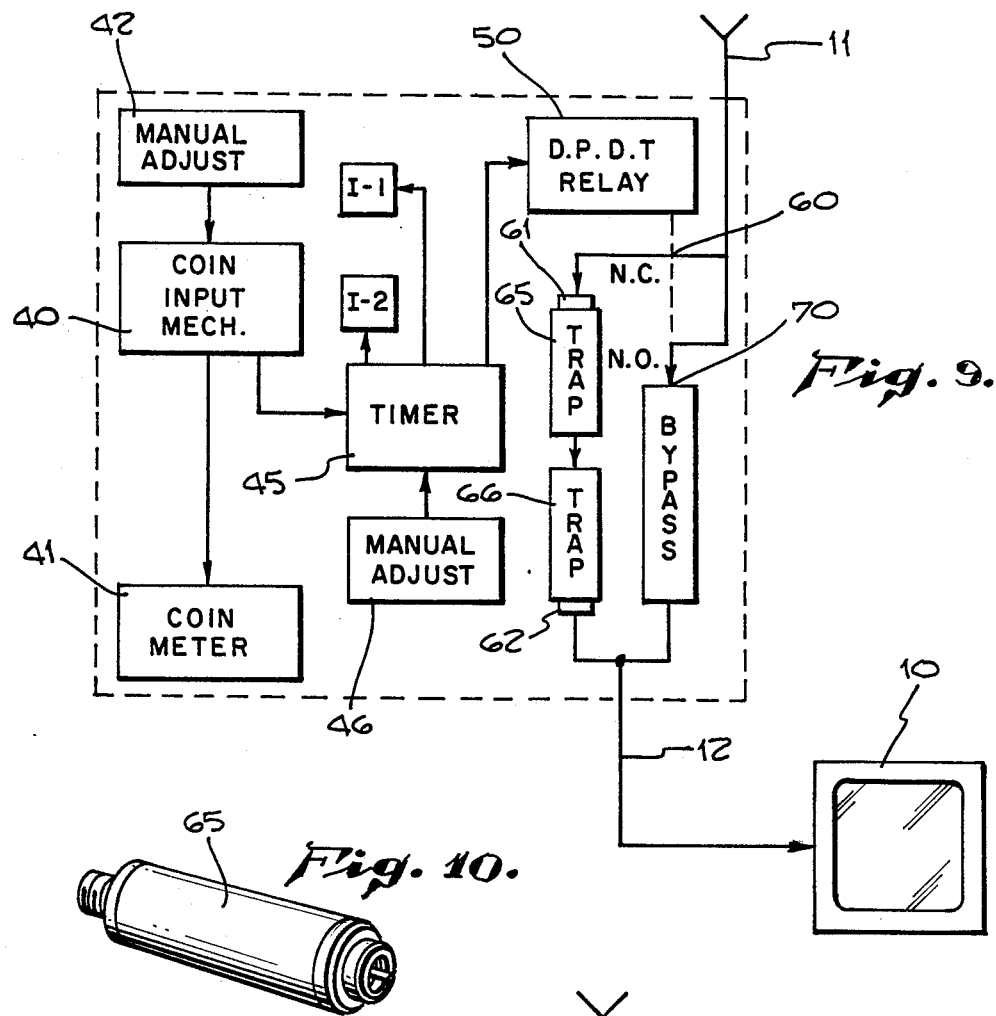
Fig. 9.
Fig. 10.
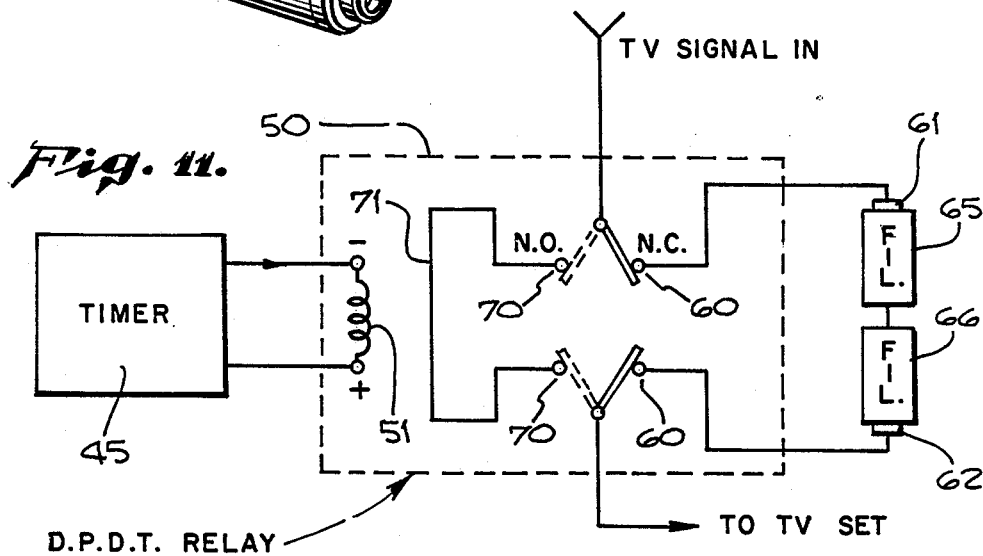
Fig. 11.

COIN-OPERATED TIMER FOR PAY TV

BACKGROUND OF THE INVENTION

Pay television has for the most part been controlled remotely, such as from the television transmitter, or from a hotel desk of a hotel which has pay television sets located in its various rooms.

It is believed that a need now exists for an economical and efficient way to control pay television directly at the site of the television set. That is, in the case of the hotel having television sets in various rooms, control and payment for the use of each set should be handled directly in the particular room in which the set is located.

Such an arrangement does, however, present a risk that hotel guests may interfere with the proper operation of the equipment, particularly insofar as the collection of money is concerned.

A further problem exists in respect to the business policy of the establishment. It is desirable to advertise the availability of television—yet false advertising is illegal, and advertising that the TV must be paid for may not be an acceptable approach.

PRIOR ART

Pertinent prior art includes U.S. Pat. No. 3,347,982 issued in 1967 to Bass et al. According to the Bass patent an interference signal was transmitted along with the program, and the subscriber's set had to be equipped with an appropriate rejection filter to keep out the interference signal and thereby make it possible to receive the picture reproduction in intelligible form.

SUMMARY OF THE INVENTION

According to the present invention the signal input line feeding the television receiver is controlled so that some channels may always be received whenever the set is on, but certain selected frequency channels can be received only during times when they have been paid for.

More specifically, a coin box is provided adjacent to the TV set and is equipped with a timer. Insertion of the proper number of coins of the proper kind will make it possible to view any one of the selected frequency channels, during the amount of time that has been paid for.

Further, the coin box is provided with internal adjustment features which are under the supervision and control of the proprietor of the establishment. The proprietor may select which channels cannot be received without payment; the type and number of coins that are required to activate the timer; and the duration of the timing cycle of the timer. From time to time the proprietor may open the coin box and change any one or more of these parameters. The box is then securely locked so that guests may not interfere with its operation.

A particular feature of the invention is that it utilizes filters or frequency traps which are of relatively low quality (low Q) and hence of low cost.

Another feature of the invention is that the apparatus is conveniently packaged in a small and low-cost unit which is easy for the customer to operate, easy for the proprietor to adjust, and easy to maintain.

Thus the object and purpose of the invention is to provide an apparatus for on-site control of a pay television receiver, for controlling the reception of certain selected frequency channels in response to the payment of money while permitting other channels to be received wihout payment, and which is economical to manufacture and easy and convenient to use.

DRAWING SUMMARY

FIG. 1 is an elevation view showing a coin box in accordance with the present invention and its placement adjacent to a television receiver which it controls;

FIG. 2 is a front perspective view of the coin box;

FIG. 3 is a cross-sectional elevation view taken on the line 3—3 of FIG. 2 looking into the coin box from its right hand side, and also showing in dotted lines the open position of the lid portion of the box;

FIG. 4 is a cross-sectional elevation view of the coin box taken on the line 4-4 of FIG. 3;

FIG. 5 is a cross-sectional elevation view of the coin box taken on the line 5—5 of FIG. 3;

FIG. 6 is a bottom plan view of the coin box taken on the line 6—6 of FIG. 3;

FIG. 7 is a perspective view of a coin used in the apparatus;

FIG. 8 is a perspective view of a token used in the apparatus;

FIG. 9 is a schematic diagram of both mechanical and electrical apparatus contained within the coin box;

FIG. 10 is a perspective view of one of the frequency traps used in the apparatus; and FIG. 11 is an electrical schematic showing the relay connections.

DETAILED DESCRIPTION

Reference is now made to the drawings illustrating the presently preferred form of the invention.

As shown in FIG. 1 a television receiver 10 receives signals from a signal input line 11 which in turn receives the signals from an antenna or the like, not shown. The input line is connected to a coin box 20, and a portion of the line leaving the coin box and feeding into the TV set (now an output signal line as far as the coin box is concerned) is identified by numeral 12. A power cord 13 supplies operating power to the coin box. Power to operate the TV set, although required, is not specifically shown in this figure.

Referring now to FIGS. 2-6, coin box 20 includes a base plate 21 which, in the preferred arrangement as shown, is disposed vertically against a wall of the room (the wall itself not being specifically shown). A partial bottom wall 22 extends horizontally outward from the bottom end of base plate 21 and has an opening 23 for receiving the various vertically extending cables which enter or leave the box.

A lid portion 25 constitutes the main part of the box 20. See the dotted lines in FIG. 3 which show the open or horizontal position of the lid portion. The lid portion 25 includes a full lid 26 which is normally parallel to the base plate 21; full side walls 27a, 27b; a full top wall 28; and a partial bottom wall 29. The two partial bottom walls 22 and 29 together enclose the entire lower end of the coin box 20 except for the cable opening 23. The abutting edges of these two partial bottom walls are joined by hinges 30, which permit the lid portion 25 to swing down to the horizontal position shown by the dotted lines.

When the lid portion is closed the side walls 27 abut securely against the respective edges of the base plate 21. In similar fashion the top wall 28 abuts against the upper edge of the base plate. The box is locked in its closed position by means of a lock 32 carried in the top wall which interengages with a lock part 33 that is attached to the upper central part of the base plate 21.

Reference is now made to FIG. 9 which shows the circuitry and mechanism of the coin box 20 in a schematic one-line diagram form. A coin input mechanism 40 receives coins and, through actuation of a counter switch 40a, FIG. 4, provides an output to coin meter 41 which then registers the total number of coins received. Coin mechanism 40 also has an output that is connected to a timer 45. Receipt of the proper number and type of coins by the coin mechanism causes the timer 45 to commence its predetermined timing cycle.

Timer 45 in turn has an output connected directly to a relay 50. Relay 50 may be generally described as being of the double-pole double-throw type. Its output terminals control the passage—or non-passage—of program signals from signal input line 11 to signal output line 12 and hence to the TV set 10. Relay 50 has a normal state or condition, and when timer 45 initiates its timing or counting cycle its output causes the relay to reverse its state. Then when the timing cycle is completed, the output from the timer causes the relay to again reverse its state and return to its original and normal state.

It will be seen that coin mechanism 40 and coin meter 41 are permanently attached to lid portion 25 of coin box 20. A circuit board 35 which includes the timer 45, and a relay 50, are permanently mounted on base plate 21 of the coin box 20, as shown in FIGS. 3 and 5.

Reference is now made to FIGS. 10 and 11 in conjunction with FIG. 9 for a further description of the circuit connections and relay operation. Signal input line 11 is connected through one of normally closed relay terminals 60 to a first coaxial connector 61. Frequency traps or rejection filters 65 and 66 are connected in series between the first coaxial connector 61 and a second coaxial connector 62. These connectors are of the F type. The second connector 62 is then connected through a second one of the normally closed terminals 60 to signal output line 12. Depending upon the frequency characteristics of the frequency traps 65 and 66, certain selected frequency channels are normally unable to reach the signal output line 12.

Signal input line 11 is also connected through normally open relay terminals 70 and a bypass circuit 71 to the signal output line 12. Since terminals 70 are normally open, no signals are normally delivered to the output line 12 through this path.

Connectors 61 and 62 are a permanent part of the apparatus of the coin box 20. Traps 65 and 66, however, are selected as desired, on the basis of their channel rejection capabilities. It is not necessary in all instances to use two of the traps, but then again, in some instances it may be desired to use more than two, and if so they are connected in series between the connectors 61 and 62.

FIG. 10 provides a perspective view of one of the frequency traps 65. This is presently a standard commercial product. It is noteworthy that according to the present invention the frequency traps are chosen with a low quality or low Q. Specifically, each trap has a sufficiently broad rejection band to reject not only the carrier frequency for a particular channel, but also the audio, video, and color signals associated therewith. It is significant that this type of filter is far less expensive than a filter that would reject a much narrower band, for example, the carrier frequency alone.

FIG. 11 shows further details of the relay circuit and its connections. Timer 45 has positive and negative D.C. output terminals which drive current through a relay coil 51 in one direction or the other. The timer and coil are illustrated in two-line diagram form. The remainder of FIG. 11 is shown in one-line diagram form. Thus the signal line 11 shown as a single line actually includes two conductors. The normally closed relay terminals 60 shown as two terminals are actually two pairs of terminals. And the normally open relay terminals 70 shown only as two terminals are actually two pairs of terminals. The mode of operation is clear from the previous explanation.

As shown in FIG. 9 the coin mechanism 40 has associated with it a manual adjustment mechanism 42. This permits the proprietor of the establishment to select what type of coin, and how many, are required to produce an output from the coin mechanism. Both the coin mechanism 40 and the adjustment mechanism 42 are well known in the art and therefore are not shown or described in detail here. As seen in FIGS. 7 and 8, the mechanisms can be adjusted to accept either actual money, or tokens provided by the establishment.

A manual adjustment 46 is provided for the timer 45, see FIG. 9. The preferred range of adjustment of the timing cycle is from a minimum of about two hours to a maximum of about twenty-four hours, in increments of ten minutes. Each establishment may choose the amount of time that it wishes to sell in a single instalment, and this time may be adjusted empirically based upon experience.

The apparatus also includes indicator lights I-1 and I-2 which indicate the state of operation. See FIGS. 2 and 9. Both are driven from timer 45. Indicator I-1 indicates that the coin box 20 is receiving power from power cord 13 and is therefore in a ready state. Indicator I-2 indicates that the timer is on, and is also a warning light which commences flashing at least about five minutes, and preferably ten minutes, before the end of the timing cycle. This permits the user to locate and insert more coins without interruption of the program. Timer 45 is preferably so designed as to accept and store additional inputs from coin mechanism 40 even while it is counting through its timing cycle. Then at the end of the counting cycle the timer responds to the stored next input signal by starting its counting cycle all over again.

METHOD OF OPERATION

When the "ready" indicator I-1 is on, the user inserts coins into coin mechanism 40. The coins are counted by switch 40a and registered in coin meter 41. The requisite number of coins produces an output to timer 45, turning it on. This causes relay 60 to close the bypass circuit 71, enabling the user to view programs on any of the certain selected frequency (pay) channels as well as on any other channel. Indicator light I-2 turns on, indicating that the time is counting through its cycle. Near the end of the timing cycle indicator I-2 flashes. At the end of the cycle the bypass circuit is re-opened, and through the operation of the relay the traps are then re-connected in series with input line 11 and output line 12. The user can then see only the "free" programs.

Because of the use of some "free" channels as well as some "pay" channels the management is perfectly at liberty to advertise that free television is furnished with the rooms.

It should be understood that the receiver here described may be part of a proprietor-originated system, in which event the programs may originate from video tapes or the like rather than from a television transmitter.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What I claim is:

1. Apparatus located directly at the site of a television receiver for controlling the purchase of programs appearing on any one or more of a group of selected frequency channels, comprising:

a coin box having a flat base member adapted to be mounted on a wall, a lid portion cooperating with said base member to form a lockable container, hinge means at the bottom of said base member and said lid portion and pivotally mounting said lid portion so that it may be opened downward to a horizontal position, a coin mechanism secured to the interior side of said lid portion, timing and relay circuits secured upon said base member, means coupling said coin mechanism to said timing circuit for initiating its operation, a signal input line and a signal output line secured upon said base member, and circuit means controlled by said relay circuit for controlling the passage of program signals from said signal input line to said signal output line;

said circuit means comprising a plurality of frequency traps whose frequencies correspond to respective ones of said group of selected frequency channels, said frequency traps being connected in a series configuration between said signal input line and said signal output line so that programs on all of said group of selected frequency channels are normally prevented from passing to said signal output line; and said circuit means further comprising a bypass circuit selectively connectable in parallel with said series of frequency traps between said signal input line and said signal output line for permitting a program received on any frequency channel to pass to said signal output line.

2. Apparatus as claimed in claim 1 wherein said coin mechanism is manually adjustable as to the type and number of coins to which it will respond.

3. Apparatus as claimed in claim 1 wherein said timing circuit has a manually adjustable timing cycle.

4. Apparatus as claimed in claim 1 which further includes detachable terminals for connecting said frequency traps in said series configuration, and wherein each of said frequency traps is a low-Q frequency trap capable of rejecting the carrier, audio, and video signals of at least one television signal channel.

5. Apparatus as claimed in claim 1 wherein said base member has a partial bottom wall extending horizontally outward from its lower end, said partial bottom wall has an opening adjacent said base member through which said input and output signal lines pass in a vertical direction, said lid portion of said box also has a partial bottom wall extending horizontally inward from its lower end, and said hinge means joins the edges of said two partial bottom walls.

6. An apparatus adapted to be used in conjunction with a television receiver for requiring payment in order to view programs on any of certain selected frequency channels while permitting the unpaid viewing of programs on other frequency channels, comprising:

a signal input line adapted to be coupled to a source of programs;

a signal output line adapted to be coupled to the television receiver;

a plurality of frequency traps, whose frequencies correspond to respective ones of said selected frequency channels, connected in a series configuration between said signal input line and said signal output line so that programs on all of said selected frequency channels are normally prevented from passing to said signal output line;

a bypass circuit selectively connectable between said signal input line and said signal output line in parallel with said series of frequency traps for permitting a program received on any frequency channel to pass to said signal output line;

relay means controlling said selective connection of said bypass circuit; and timing means controlling the operation of said relay means.

7. Apparatus as claimed in claim 6 which further includes coin-operated means controlling the operation of said timing means.

8. Apparatus as claimed in claim 7 wherein said coin-operated means is manually adjustable as to the type and number of coins to which it will respond.

9. Apparatus as claimed in claim 6 wherein said timing means has a manually adjustable timing cycle.

10. Apparatus as claimed in claim 6 which further includes detachable terminals for connecting said frequency traps in said series configuration, and wherein each of said frequency traps is a low-Q frequency trap capable of rejecting the carrier, audio, and video signals of at least one television signal channel.

11. An apparatus adapted to be used in conjunction with a television receiver for requiring payment in order to view programs on any of certain selected frequency channels while permitting the unpaid viewing of programs on all other frequency channels, comprising:

a signal input line adapted to be coupled to a source of programs;

a signal output line adapted to be coupled to the television receiver;

a plurality of frequency traps, whose frequencies correspond to respective ones of said selected frequency channels, connected in a series configuration between said signal input line and said signal output line so that programs on all of said selected frequency channels are normally prevented from passing to said signal output line;

a bypass circuit selectively connectable between said signal input line and said signal output line in parallel with said series of frequency traps for permitting a program received on any frequency channel to pass to said signal output line;

relay means controlling said selective connection of said bypass circuit;

timing means controlling the operation of said relay means;

a coin box having a flat base member adapted to be mounted on a wall, a lid portion cooperating with said base member to form a lockable container, and hinge means at the bottom of said base member and said lid portion and pivotally mounting said lid portion so that it may be opened downward to a horizontal position;

said timing means and said relay means being secured upon said base member;

a coin mechanism secured to the interior side of said lid portion; and means coupling said coin mechanism to said timing means for initiating its operation.

12. Apparatus as claimed in claim 11 wherein said coin mechanism is manually adjustable as to the type and number of coins to which it will respond.

13. Apparatus as claimed in claim 11 wherein said timing means has a manually adjustable timing cycle.

14. Apparatus as claimed in claim 11 which further includes detachable terminals for connecting said frequency traps in said series configuration, and wherein each of said frequency traps is a low-Q frequency trap capable of rejecting the carrier, audio, and video signals of at least one television signal channel.

15. Apparatus as claimed in claim 11 wherein said base member has a partial bottom wall extending horizontally outward from its lower end, said partial bottom wall has an opening adjacent said base member through which said input and output signal lines pass in a vertical direction, said lid portion of said box also has a partial bottom wall extending horizontally inward from its lower end, and said hinge means joins the edges of said two partial bottom walls.

16. An apparatus adapted to be used in conjunction with a television receiver for requiring payment in order to view programs on any of certain selected frequency channels while permitting the unpaid viewing of programs on other frequency channels, comprising:

a signal input line adapted to be coupled to a source of programs;

a signal output line adapted to be coupled to the television receiver;

a plurality of frequency traps, whose frequencies correspond to respective ones of said selected frequency channels, connected in a series configuration between said signal input line and said signal output line so that programs on all of said selected frequency channels are normally prevented from passing to said signal output line;

a bypass circuit selectively connectable between said signal input line and said signal output line in parallel with said series of frequency traps for permitting a program received on any frequency channel to pass to said signal output line;

relay means having normally open output terminals controlling said selective connection of said bypass circuit; and timing means controlling the operation of said relay means.

17. An apparatus adapted to be used in conjunction with a television receiver for requiring payment in order to view programs on any of certain selected frequency channels while permitting the unpaid viewing of programs on other frequency channels, comprising:

a signal input line adapted to be coupled to a source of programs;

a signal output line adapted to be coupled to the television receiver;

a plurality of frequency traps, whose frequencies correspond to respective ones of said selected frequency channels, connected in a series configuration between said signal input line and said signal output line so that programs on all of said selected frequency channels are normally prevented from passing to said signal output line;

a bypass circuit selectively connectable between said signal input line and said signal output line in parallel with said series of frequency traps for permitting a program received on any frequency channel to pass to said signal output line;

relay means having normally open output terminals controlling said selective connection of said bypass circuit;

timing means controlling the operation of said relay means; and a coin mechanism having output means coupled to said timing means and to said relay means, said output means being responsive to the insertion of coins into said coin mechanism for actuating said relay means to close said normally open output terminals, thereby enabling signals within the selected frequency channels to reach said signal output line.

18. An apparatus adapted to be used in conjunction with a television receiver for requiring payment in order to view programs on any of certain selected frequency channels while permitting the unpaid viewing of programs on other frequency channels, comprising:

a signal input line adapted to be coupled to a source of programs;

a signal output line adapted to be coupled to the television receiver;

a plurality of frequency traps, whose frequencies correspond to respective ones of said selected frequency channels, connected in a series configuration between said signal input line and said signal output line so that programs on all of said selected frequency channels are normally prevented from passing to said signal output line;

a bypass circuit selectively connectable between said signal input line and said signal output line in parallel with said series of frequency traps for permitting a program received on any frequency channel to pass to said signal output line;

relay means controlling said selective connection of said bypass circuit;

timing means having a predetermined timing cycle for controlling the operation of said relay means; and visible indicator means controlled by said timing means and operable for generating a visible warning signal at least about five minues before the end of said predetermined timing cycle.

19. An apparatus adapted to be used in conjunction with a television receiver for requiring payment in order to view programs on any of certain selected frequency channels while permitting the unpaid viewing of programs on other frequency channels, comprising:

an openable box having means for closing the same and securing it against tampering;

a signal input line extending within said box adapted to be coupled to a source of programs;

a signal output line extending out from said box adapted to be coupled to the television receiver;

a plurality of frequency traps whose frequencies correspond to respective ones of said selected frequency channels;

first and second coaxial cable connectors connecting said frequency traps in a series configuration between said signal input line and said signal output line so that programs on all of said selected frequency channels are normally prevented from passing to said signal output line;
a bypass circuit selectively connectable between said signal input line and said signal output line in parallel with said series of frequency traps for permitting a program received on any frequency channel to pass to said signal output line;
relay means controlling said selective connection of said bypass circuit; and
timing means controlling the operation of said relay means.

* * * * *